United States Patent [19]

Shah

[11] 4,000,117
[45] Dec. 28, 1976

[54] NOVEL COMPOSITIONS

[75] Inventor: Tilak M. Shah, s-Hertogenbosch, Netherlands

[73] Assignee: The Upjohn Company, Kalamazoo, Mich.

[22] Filed: Mar. 31, 1975

[21] Appl. No.: 563,465

[52] U.S. Cl. .................. 260/75 NK; 260/18 TN; 260/28 R; 264/176 R; 428/425
[51] Int. Cl.² .................. C08G 18/42; C08G 18/00
[58] Field of Search ............... 260/75 NK, 28, 858

[56] References Cited

UNITED STATES PATENTS

| | | | |
|---|---|---|---|
| 2,801,648 | 8/1957 | Anderson et al. | 260/75 NK |
| 2,953,539 | 9/1960 | Keplinger et al. | 260/75 NK |
| 3,094,510 | 6/1963 | Parker et al. | 260/75 NK |

OTHER PUBLICATIONS

Wright & Cumming—Solid Polyurethane Elastomers, Maclaren, London, pp. 305–307.
Saunders et al., Polyurethanes Part II. Interscience, (N.Y.) 1964, pp. 377–383.
Schollenbergen et al., Rubber World, Jan. 1958, pp. 549–555.
Waugaman, Modern Plastics, Oct. 1961, pp. 146–152, 229 and 331.

*Primary Examiner*—H.S. Cockeram
*Attorney, Agent, or Firm*—James S. Rose; Denis A. Firth

[57] ABSTRACT

Two solvent soluble thermoplastic polyurethane elastomers and blends thereof are characterized by a hardness from about 67 Shore A to about 58 Shore D. The softer of the two elastomers is derived from the reaction of 4,4'-methylenebis(phenylisocyanate) and a poly(1,4-butylene adipate) which has a molecular weight of 600–750. The harder of the two elastomers is derived from the reaction of the same isocyanate and a combination of a major portion of poly(neopentylene adipate) of M.W. circa 450–550 and a minor portion of a poly(1,4-butylene adipate) of M.W. circa 300–360. The elastomers find particular utility as solution grade materials for various types of coatings and the like.

16 Claims, No Drawings

NOVEL COMPOSITIONS

BACKGROUND OF THE INVENTION

1. Field of the Invention

This invention relates to polyurethane elastomers and methods for their preparation and is more particularly concerned with solution grade polyurethane elastomers.

2. Description of the Prior Art

Polyurethane elastomers derived from 4,4'-methylenebis (phenylisocyanate) (MDI) and polyester diols are well known in the art, see for example U.S. Pat. No. 2,625,535 and U.S. Pat. No. 3,298,995. Solution grade polyurethane elastomers are also well known in the art; see U.S. 2,871,218, 3,298,995 and 3,632,845. In general it has been recognized previously that, in order to obtain a soluble thermoplastic polyester polyurethane elastomer possessing good physical properties, such as good tensile strength and elongation at a given hardness, the aromatic diisocyanate be reacted with a combination of a linear hydroxyl terminated polyester and a saturated short chain aliphatic diol or other form of difunctional extender. The prior art has taught that the ratio of isocyanate groups to reactive hydroxyl groups be essentially unity; see for example U.S. Pat. No. 2,871,218.

I have now found, quite surprisingly, that such solvent soluble thermoplastic polyurethanes can be formulated without the usual short chain diol, by relying on the structure of the macroglycol - MDI block to obtain the desired combination of solvent solubility and good properties in a given hardness range. I have also found quite unexpectedly, that the ratio of NCO:OH must be less than unity. The molecular weight ranges of the polyester diols employed in the present invention, in general have not hitherto been considered high enough to be useful for the preparation of solvent soluble thermoplastic polyurethane elastomers.

SUMMARY OF THE INVENTION

The invention comprises an aprotic oxygen-containing organic solvent soluble thermoplastic polyurethane elastomer characterized by a hardness from about 67 Shore A to about 58 Shore D which comprises:

A. from about 100 percent to about 0 percent by weight of a polyurethane having the recurring unit

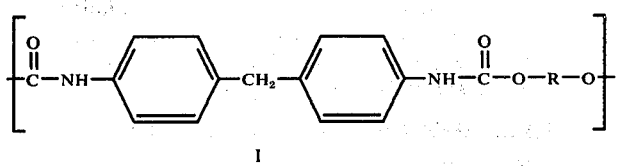

I wherein R is the residue of a hydroxyl terminated poly(1,4-butylene adipate) having a molecular weight from about 600 to about 750, and wherein the proportion of said residue R to said residue

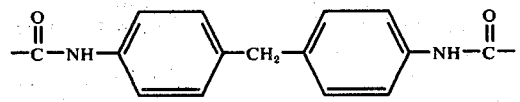

in the overall recurring units is 1:0.95-0.98; and

B. from about 0 percent to about 100 percent by weight of a polyurethane having the recurring unit

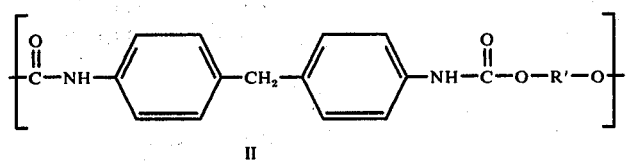

II wherein from about 67 percent to about 72 percent of said recurring units are those in which R' represents the residue of a hydroxyl terminated poly(neopentylene adipate) having a molecular weight from about 450 to about 550, and from about 33 percent to about 28 percent of said recurring units are those in which R' represents the residue of a hydroxyl terminated poly(1,4-butylene adipate) having a molecular weight from about 300 to about 360, and wherein the total proportion of said residue R' to said residue

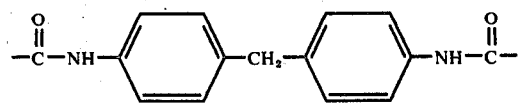

in the overall recurring units is 1:0.95-0.98.

The invention also comprises the individual aprotic oxygen-containing organic solvent soluble thermoplastic polyurethane elastomers having the recurring unit I and II.

The invention also comprises compositions comprising aprotic oxygen-containing organic solvents and the elastomers I and II, and mixtures thereof.

The term "hydroxyl terminated poly(1,4-butylene adipate)" means a polyester diol derived from 1,4-butanediol and adipic acid and having terminal hydroxyl groups and having the respective molcular weight ranges set forth hereinabove. The term "hydroxyl terminated poly(neopentylene adipate)" means a polyester diol derived from neopentyl alycol and adipic acid and having terminal hydroxyl groups and having the molecular weight range set forth hereinabove.

The term "hardness" means the resistance to indentation as measured on the Shore A durometer scale and/or Shore D durometer scale according to the test methods set forth in ASTM D2240-64T.

DETAILED DESCRIPTION OF THE INVENTION

The soluble thermoplastic polyester polyurethane elastomers of the invention can be prepared by processes conventional in the art for the synthesis of thermoplastic polyurethane elastomers. The novelty resides in the preparation of a so-called soft elastomer, having a hardness of about 67 Shore A durometer to about 73 Shore A durometer, by the reaction of a poly(1,4-butylene adipate) characterized by a specific, low and narrow molecular weight range, with 4,4-methylenebis (phenylisocyanate), hereinafter called MDI, at a specific isocyanate to hydroxyl ratio of less than unity. In a further novel aspect of the present invention, a so-called hard elastomer having a hardness of about 52 Shore D durometer to about 58 Shore D durometer is prepared in the same manner as the soft elastomer, except that the macrodiol component is a mixture of two different polyester components combined in specific proportions. Each polyester in turn, is characterized by its own low molecular weight range. And the MDI isocyanate to hydroxyl ratio is less than unity. In yet a further novel aspect of the present invention, blends of the soft and hard elastomer of the present invention in all proportions are prepared to provide soluble elastomers that fall within the hardness range from about 67 Shore A durometer to about 58 Shore D durometer.

The processes which can be employed to prepare the elastomers of the invention include the one-shot procedure in which all reactants are brought together simultaneously, and the prepolymer procedure in which a deficiency of isocyanate is reacted with the polyester diol (or polyester diol combination) in a preliminary step and the hydroxyl terminated prepolymer so produced is subsequently reacted with the balance of the isocyanate. The one-shot procedure is the preferred method of preparing the elastomeric polyurethanes of the invention. The preparation can also be carried out in solution since the products are soluble in aprotic oxygen-containing organic solvents. The elastomers can be isolated therefrom by standard methods, or in the alternative they can be left in solution to be stored or used in that form. In a most preferred embodiment of the one-shot procedure the polyurethane elastomers of the invention are prepared by a continuous procedure such as that set forth in U.S. Pat. No. 3,642,924 with the exception that a difunctional extender is not necessary.

The poly(1,4-butylene adipates) employed in preparing the soft polyurethane elastomers of the present invention are essentially linear hydroxyl terminated polyester diols having a molecular weight from about 600 to about 750. A particularly preferred poly(1,4-butylene adipate) is one which has a molecular weight of about 700.

The properties and, in particular, the hardness range of the soft elastomers are due to the structure of the macroglycol-MDI block having the recurring unit (I), derived from the poly(1,4-butylene adipate) having the molecular weight range set forth hereinabove, wherein R is the residue of said poly(1,4-butylene adipate). If a poly(1,4-butylene adipate) of molecular weight above or below the range called for is employed, the resulting elastomers will not possess the combination of solubility and good physical properties at the desired hardness.

The poly(neopentylene adipate) employed in the polyester diol combination used in preparing the hard polyurethane elastomer of the present invention is an essentially linear hydroxyl terminated polyester diol having a molecular weight from about 450 to about 550. A particularly preferred poly(neopentylene adipate) is one which has a molecular weight of about 500.

The poly(1,4-butylene adipate) employed as the other polyester diol component in the preparation of the hard polyurethane elastomer of the invention is an essentially linear hydroxyl terminated polyester diol having a molecular weight from about 300 to about 360. A particularly preferred poly(1,4-butylene adipate) is one which has a molecular weight of about 330.

The properties and hardness of the hard elastomer of the present invention are due to the structure of the macroglycol-MDI block having the recurring unit (II), wherein R' represents the residues of said poly(neopentylene adipate) and said poly(1,4-butylene adipate) in definite proportions in said recurring unit. The proportions of said polyester residues are such that about 67 percent to about 72 percent of said recurring units are those in which R' represents the residue of said poly(neopentylene adipate), and from about 33 percent to about 28 percent are those in which R' represents the residue of said poly(1,4-butylene adipate). A particularly preferred proportion is one wherein about 69 percent of said recurring units are those in which R' represents the residue of said poly(neopentylene adipate) and about 31 percent are those in which R' represents the residue of said poly(1,4-butylene adipate).

The poly(1,4-butylene adipates) and poly(neopentylene adipates) employed in preparing the polyurethane elastomers of the present invention are obtained by the reaction of adipic acid with an excess over the stoichiometric proportion of 1,4-butanediol or neopentyl glycol using procedures well recognized in the art for the preparation of polyester diols.

When polyesters of higher or lower molecular weight, or in different proportions than those called for are used, the resulting elastomers do not possess the combination of solubility and good physical properties at the desired hardness.

The proportion of hydroxyl equivalents of the single poly(1,4-butylene adipate) to the equivalents of 4,4-methylenebis(phenylisocyanate) employed in the preparation of the soft elastomers is advantageously within the range of about 1:0.95 to 1:0.98 and, preferably, is about 1:0.97. Therefore in the elastomers which have the recurring unit (I) set forth hereinabove, the proportion of said residue R to said residue

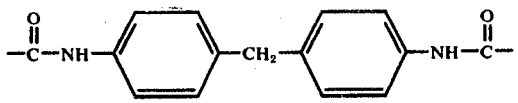

which is derived from MDI, in the overall recurring units is advantageously 1:0.95-0.98, and preferably is about 1:0.97.

In like fashion, in the hard elastomers of the present invention which have the recurring unit (II) set forth hereinabove, the proportion of said residue R' to said residue

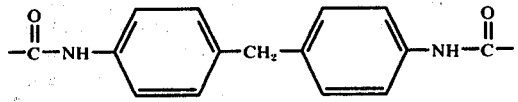

is advantageously 1:0.95-0.98, and preferably is about 1:0.97.

When elastomers are prepared wherein the ratio of the residue R, or R' to the MDI residue in the recurring units (I) or (II) is smaller than called for, for example, 1:1, the elastomer is insoluble. Conversely, when the ratio is made larger, for example, 1:0.94, while the elastomers produced thereby remain soluble, their physical properties are unacceptable.

Compositions comprising the termoplastic polyurethane elastomers of the present invention and aprotic oxygen-containing organic solvents find a wide sphere of utility. As well as including soluble wax lubricating agents discussed in detail hereinbelow, the compositions can include useful adjuvants such as colorants, fire retardants, extending agents, stabiliziers, antioxidants and the like, with the proviso that said adjuvants are soluble in the composition. Compositions which include the soluble elastomers of the invention are formed by any method of preparing solutions of elastomers known to those skilled in the art. The elastomer-solvent mixture may be heated to decrease the dissolution time. The concentration of elastomer in percent by weight in the solution is advantageously from about 1 percent to about 30 percent, and preferably from about 5 percent to about 25 percent. Blends of the soft and hard elastomers of the invention mixed in any proportions can be dissolved in a suitable solvent. The solutions can then be used for coatings, adhesives, etc., by spreading, dipping, brushing, spraying, and the like, and in the preparation of films.

Solvents suitable for preparing such solutions are any of the solvents that are included in the class of aprotic oxygen-containing organic solvents. Illustrative of such solvents are dimethylformamide, dimethylacetamide, dimethylsulfoxide, tetramethylurea, cyclohexanone, tetrahydrofuran, dioxane, acetone, methylethyl ketone, and mixtures thereof. A preferred group consists of acetone, methylethyl ketone, tetrahydrofuran, and mixtures thereof.

Blends of the soft and hard elastomers of the present invention can be prepared in all proportions which include from about 100 percent to about 0 percent by weight of the polyurethane having the recurring unit (I), and from about 0 percent to about 100 percent by weight of the polyurethane having the recurring unit (II). Said mixtures are characterized by a hardness from about 67 Shore A durometer to about 58 Shore D durometer. It has been disclosed hereinabove that such blends can be easily prepared by dissolving the elastomers in the desired proportions in solution.

In another embodiment of the blending procedure of the present invention, the mixture in the elastomers of the present invention, the mixture in pelletized, or other suitable comminuted form, is dry-blended in a Banbury mixer, or any other suitable blending apparatus. In a most preferred method the desired combination of elastomers is extruded through any type of suitable extrusion apparatus known to those skilled in the art. The procedure ensures optimal blend uniformity of the solid elastomers when not prepared, or mixed in solution. The physical mixture of the elastomers, which have been either pre-dried, or else dried in the feeder hopper of the extruder at a drying temperature of about 160° to about 225° F for a period of about 1-2 hours, is extruded at elevated temperatures. The temperature should be increased in the various zones of the extruder to a maximum at the die. For example, the rear zone of the extruder is heated to about 350° F, while the middle and front zones are heated to about 370° F and 380° F respectively, and the die is maintained at 380° F. It will be readily apparent that temperatures, etc., well vary somewhat according to the particular extrusion apparatus. However, the conditions and temperatures for extrusion can be readily determined by trial and error for any suitable apparatus by those skilled in the art. The extrudate can be in any form such as spaghetti, film, etc., but the spaghetti form is particularly advantageous for chopping and bagging.

As set forth above, the polyurethane elastomers of the invention are preferably made by the one-shot procedure and most preferably by a continuous one-shot procedure. In such procedures the reactants are brought together in any order. Advantageously, in the case of the hard elastomers, the polyols are preblended and fed to the reaction mixture as a single component, the other component being the diisocyanate. The mixing of the reactants can be accomplished by any of the procedures and apparatus convention in the art. Preferably the individual components are rendered substantially free from the presence of extraneous moisture using conventional procedures, for example, by azeotropic distillation using benzene, toluene, and the like, or by heating under reduced pressure at a temperature above the boiling point of water at the pressure employed.

The mixing of the reactants can be carried out at ambient temperature (of the order of 25° C) and the resulting mixture is then heated to a temperature of the order of about 40° C to about 120° C, preferably to a temperture of about 90° C to about 110° C. Alternatively, and preferably, one or more of the reactants is preheated to a temperature within the above ranges before the admixing is carried out. Advantageously, in a batch procedure, the heated reaction components are subjected to degassing in order to remove entrained bubbles of air or other gases before reaction takes place. This degassing is accomplished conveniently by reducing the pressure under which the component are maintained until no further evolution of bubbles occurs. The degassed reaction components are then admixed and transferred to suitable molds or extrusion equipment or the like and cured at a temperature of the order of about 20° C to about 115° C. The time required for curing will vary with the temperature of curing and also with the nature of the particular composition. The time required in any given case can be determined by a process of trial and error.

The elastomers of the present invention are easily prepared in aprotic oxygen-containing organic solvents. The conditions and temperatures set forth hereinbefore for the one-shot procedure can be used when the preparations are performed in solution. Generally speaking, the reaction temperatures are somewhat lower when in solvent and the reaction time is easily determined by simple trial and error.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose; see for example, Saunders, et al., Polyurethanes, Chemistry and Technology, Part I, Interscience, New York, 1963, pages 228–232; see also, Britain et al., J. Applied Polymer Science, 4, 207–211, 1960. Such catalysts include organic and inorganic acid salts of, and organometallic derivatives of, bismuth, lead, tin, iron antimony, uranium, cadmium, cobalt, thorium, aluminum, mercury, zinc, nickel cerium, molybdenum, vanadium, copper, manganese, and zirconium, as well as phosphines and tertiary organic amines. Representative organotin catalysts are stannous octoate, stannous oleate, dibutyltin dioctoate, dibutyltin dilaurate and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, and the like. The amount of catalyst employed is generally within the range of about 0.02 to about 2.0 percent by weight based on the total weight of the reactants.

If desired, the elastomers of the invention can have incorporated in them, at any appropriate stage of their preparation, additives such as pigments, fillers, stabilizers, antioxidants, coloring agents, fire retardants and the like which are commonly used in conjunction with polyurethane elastomers.

In preferred formulations of the present invention there is included an aprotic oxygen-containing organic solvent soluble wax lubricating agent in both the soft and the hard elastomers. Wax lubricating agents are commonly employed in polyurethane elastomer technology to provide for both internal and external lubrication of the elastomer which results in easier processing during extrusionor injection molding steps. Additionally, a wax lubricant acts as an antiblocking agent for chopped pellets. Illustrative of such lubricants are: esters of fatty acids, fatty alcohols, fatty acids, calcium stearate glycerine monooleate, ethylenebisstearylamide, and the like. These waxes are for the most part insoluble in aprotic solvents like acetone, methylethylketone, etc., and while they would be useful adjuvants for the processing of the solid elastomers of the present invention, they would not be suitable for processing solutions of the same elastomers.

I have found that the incorporation in the elastomers of the present invention of from about 0.25 percent by weight to about 5 percent by weight of the formulation weight, of a soluble wax lubricating agent provides for advantageous properties during the processing of said elastomers. Preferably, there is incorporated from about 0.5 percent by weight to about 1.0 percent by weight of said lubricating agent. In a further advantage to flow from the use of these agents, one is able to obtain better workability of the elastomer solutions of the present invention such as, covering power, ease of flow, and uniformity of solution thickness. Furthermore, the films obtained from said solutions while possessing thickness uniformity, are surprisingly tack-free.

Any soluble wax lubricating agent known to those skilled in the art is suitable. A particularly preferred group of such agents are a class of multi-functional, relatively high molecular esters, the alkyl residues of which must not exceed 18 carbon atoms. Examples of three such lubricating agents are supplied by Henkel International GmbH, Dusseldorf and are identified by the trademark names of Loxiol G-70, Loxiol G-71, and Loxiol G-72 (see Kunststoffe, Vol. 61, p 645, 1971).

The elastomers of the invention can be used for purposes well-known in the art for solution grade polyurethane elastomers, for example, leather coating, shoe dressing; fabric coating for upholstery, rainwear, sportswear; adhesives for leather to vinyl, foam to vinyl, ABS, etc., coatings for vinyl and urethane foam for upholstery, cushioning, athletic equipment; for surgical gloves; rigid plastics coating, for athletic equipment, wall coverings; wood coating for bowling pins, flooring; metal coating for undersea parts, tank linings, and seals. These applications are readily performed by spreading, dipping, brushing, spraying, etc.

The following examples describe the manner and process of making and using the invention and set forth the best mode contemplated by the inventor of carrying out the inventon but are not to be construed as limiting.

EXAMPLE 1

A series consisting of five elastomers A through E was prepared from 4,4'-methylenebis(phenylisocyanate), with poly(1,4-butylene adipate) diols of varying molecular weight. In three cases, 1,4-butanediol was added as an extender. The following standard procedure was employed in all cases:

The polyester diol was degassed by heating under reduced pressure at 90° to 100° C for 30 minutes. In those examples in which 1,4-butanediol extender was added, an additional stirring and degassing step wws performed after the butanediol addition under the conditions set forth above. To the degassed liquid still at 110° C, were added the following ingredients as percent by weight of total reactants: 0.05 percent of a 50/50(% by wt.) mixture of stannous octoate dissolved in dioctyl phthalate, 0.5 percent of Loxiol G-72 (a solvent soluble high molecular weight wax lubricating agent supplied by Henkel International GmbH, Dusseldorf), and 0.5 percent of an antioxidant, stearyl-β(3,5-dibutyl-4-hydroxyphenyl) propionate, followed by the 4,4'-methylenebis(phenylisocyanate). The resultant mixture was subjected to high speed mechanical stirring for 15 seconds and then poured into Teflon-lined aluminum trays. The elastomer was allowed to stand at room temperature (20° C) for 24 hours. Thereafter the elastomer was chopped into pieces, granulated, and dried at 180° F for 3 hours. A solution consisting of 25 percent by weight of the elastomer dissolved in tetrahydrofuran was prepared (where possible), from which films were cast for test purposes. The films were dried for 24 hours at room temperature, followed by 16 hours at 60° C then allowed to stand for 7 days. The cured films were then subjected to physical testing.

The primary ingredients and proportions (in equivalents) employed in the preparation of the various elastomers, together with the properties thereof are set forth in Table I below.

TABLE I

| Elastomer | A | B | C | D | E |
|---|---|---|---|---|---|
| 4,4'-methylenebis (phenylisocyanate) | 1.45 | 1.94 | 1.21 | 0.97 | 1.00 |
| 1,4-butanediol | 0.5 | 1.0 | 0.25 | | |
| poly(1,4-butylene adipate) (M.W. = 1000) | 1.0 | | | | |
| poly(1,4-butylene adipate) (M.W. = 2000) | | 1.0 | | | |
| poly(1,4-butylene adipate) (M.W. = 750) | | | 1.0 | 1.0 | 1.0 |
| NCO/OH | 0.97 | 0.97 | 0.97 | 0.97 | 1.0 |
| Elastomer Properties: | | | | | |
| Solubility (Tested at % by wt. in): | | | | | |
| 10% acetone | Insol. | Insol. | Insol. | Sol. | Insol. |
| 10% methylethylketone | Insol. | Insol. | Insol. | Sol. | Insol. |
| 25% tetrahydrofuran | Insol. | Insol. | Insol. | Sol. | Swells |
| Hardness, Shore A | | | | 70A | |
| Elastic modulus, psi | | | | | |
| 50% | | | | 250 | |
| 100% | | | | 350 | |
| 200% | | | | 380 | |
| 300% | | | | 520 | |
| Tensile str., psi | | | | 3000 | |
| Elongation at break, % | | | | 550 | |
| Die C, pli | | | | 200 | |

Elastomer D prepared in accordance with the present invention is a soluble polyurethane possessing good physical properties normally associated with a urethane elastomer in this hardness range. In contrast, the elastomers A, B, C, and E not made within the teachings of the present invention are insoluble.

The Elastomer D was chopped into small pieces and 75 g. of the elastomer was charged to a 500 ml. round bottom flask with 225 g. of dry tetrahydrofuran. The mixture was stirred for 6 hours at room temperature (circa 20° C) and at the end of which time a clear pale yellow solution remained. The viscosity of the 25 percent by weight solids solution was determined at room temperature with a Brookfield viscometer and was 340 centipoise.

EXAMPLE 2

A series of elastomers F through M was prepared from 4,4'-methylenebis(phenylisocyanate) and a variety of combinations of a poly(1,4-butylene adipate)(M.W.=330) and a poly(neopentylene adipate)(M.W.=500), with and without diol extenders. Included in the series was a copolymer consisting of a poly(1,4-butyleneneopentylene adipate) (M.W.=500) wherein the mole proportion of butylene groups to neopentylene groups is 65/35. The following standard procedure was employed in all cases:

The polyester diol was degassed by heating under reduced pressure at 90 to 110° C for 30 minutes, and when a mixture of polyester diols was employed, the degassing procedure was carried out separately with each polyester. In addition, in those examples in which a diol extender was employed, the degassing step was repeated under the same conditions after its addition. To the degassed liquid still at 110° C, were added the following ingredients as percent by weight of total reactants: 0.05 percent of a 50/50(% by wt.) mixture of stannous octoate dissolved in dioctyl phthalate, 0.5 percent of the same antioxidant material of Example 1, and 4,4'-methylenebis(phenylisocyanate). The resultant mixture was subjected to high speed mechanical stirring for 15 seconds and then poured into Teflon-lined aluminum trays. The elastomer was allowed to stand at room temperature (20° C) for 24 hours. Thereafter the elastomer was chopped into pieces, granulated, and dried at 180° F for 6 hours. A solution consisting of 25 percent by weight of the elastomer dissolved in tetrahydrofuran was prepared (where possible), from which films were cast for test purposes. The films were dried for 24 hours at room temperature, followed by 16 hours at 60° C then allowed to stand 7 days. The cured films were then subjected to physical testing.

The primary ingredients, and proportions (in equivalents) employed in the preparation of the various elastomers, together with the properties thereof are set forth in Table II below.

TABLE II

| Elastomer | F[1] | G | H | I | J | K | L | M |
|---|---|---|---|---|---|---|---|---|
| 4,4'-methylenebis (phenylisocyanate) | 0.97 | 0.97 | 0.97 | 0.97 | 1.26 | 1.11 | 1.26 | 1.36 |
| poly(1,4-butylene adipate) (M.W.=330) | 0.31 | 0.31 | 0.50 | 0.25 | | 1.0 | | |
| poly(neopentylene adipate) (M.W.=500) | 0.69 | 0.69 | 0.50 | 0.75 | 1.0 | | | |
| poly(1,4-butylene-neopentylene adipate) (M.W.=500) | | | | | | | 1.0 | |
| poly(1,4-butylene adipate) (M.W.=500) | | | | | | | | 1.0 |
| 1,4-butanediol | | | | | 0.3 | | 0.3 | |
| neopentylglycol | | | | | | 0.15 | | 0.4 |
| NCO/OH | 0.97 | 0.97 | 0.97 | 0.97 | 0.97 | 0.97 | 0.97 | 0.97 |
| Elastomer properties: | | | | | | | | |
| Solubility (Tested at % by wt. in): | | | | | | | | |
| 10% acetone | Sol. | Sol. | Sol. | Sol. | Sol. | Insol. | Gel | Sol. |
| 10% methylethylketone | Sol. | Sol. | Sol. | Sol. | Sol. | Insol. | Gel | Sol. |
| 25% tetrahydrofuran | Sol. | Sol. | Sol. | Sol. | Sol. | Sol. | Gel | Gel |
| Hardness, Shore D | 57 | 58 | 60 | 65 | 65 | | | |
| Density gms./cc | 1.2 | 1.18 | 1.1 | 1.18 | 1.22 | | | |
| Elastic modulus, psi | | | | | | | | |
| 50% | 900 | 1210 | 490 | 730 | 2750 | | | |
| 100% | 1010 | 1230 | 590 | 810 | 2790 | | | |

TABLE II-continued

| Elastomer | F¹ | G | H | I | J | K | L | M |
|---|---|---|---|---|---|---|---|---|
| 200% | 1500 | 2430 | 1140 | 1390 | 4380 | | | |
| 300% | 3000 | 5600 | 2300 | 2740 | 4560 | | | |
| Tensile str. psi | 5000 | 5990 | 2130 | 2700 | 8090 | | | |
| Elongation at break (%) | 340 | 310 | 300 | 310 | 300 | | | |
| Die C, pli | 460 | 620 | 280 | 320 | | | | |

F¹ Contains 0.5 percent by weight of Loxiol .. G-72 (a high M.W. wax lubricating agent supplied by Henkel International GmbH, Dusseldorf)

Elastomers F and G, prepared in accordance with the present invention, are soluble polyurethanes possessing excellent physical properties. Elastomers H and I, while employing the same polyesters as used in Elastomers F and G, do not contain them within the specific proportions called for by the present invention. Although Elastomers H and I are soluble, their Shore D hardness values exceed the value range of the present invention while their poor properties do not reflect these hardness values. In fact, Elastomers H and I can be classified as dead. Elastomers J and K are also not prepared according to the present invention and illustrate the result of employing one of the polyester diols of the invention, along with an extender diol corresponding to the one used in the preparation of the second polyester component. Elastomer J which contains a poly(neopentylene adipate) called for by the present invention along with 1,4-butanediol as an extender, is soluble but its hardness exceeds the limit of the present invention and its properties are poor and it can be classified as boardy or glassy. Elastomer K was prepared using a poly(1,4-butylene adipate) of the present invention with neopentylglycol as extender. The product was insoluble in both acetone and methylethyl ketone. Elastomer L is an elastomer not made in accordance with the present invention and employing a copolymer comprising a poly(1,4-buteneneopentylene adipate) wherein the mole ratio of butylene to neopentylene is about 65:35 and 1,4-butanediol as extender. Th elastomer is not soluble, forming only gels when dissolution was attempted. Elastomer M employs a poly(1,4-butylene adipate) outside the molecular weight range called for by the present invention and neopentyl glycol as extender. Elastomer M while soluble in acetone and methylethyl ketone, formed only a gel in tetrahydrofuran and a film could not be obtained for testing.

A sample of chopped Elastomer F, 75 g., was placed in a 1 liter round bottom flask with 675 g. of dry methylethyl ketone. The mixture was stirred for 6 hours at room temperature and at the end of which time a clear pale yellow solution remained which was 10 percent by weight in solids. The viscosity of the solution was determined at room temperature with a Brookfield viscometer and was 25 centipoise.

EXAMPLE 3

A series of blends (labelled a through e) of two of the soluble polyurethane elastomers prepared in accordance with the present invention was prepared. A single screw extruder which had a length/diameter ratio of 15:1 and which had a feed hopper equipped with its own air dryer, was charged with the different blends comprising one elastomer prepared according to Example 1, Elastomer D (hardness = Shore A70), and the second elastomer prepared according to Example 2, Elastomer F (hardness = Shore D57). The hopper was charged with the mixture of the two elastomers in pelletized form and in the proportions of percent by weight as set forth in Table III below. The pellets were dried at an inlet air temperature of 180° F for 2 hours. The blends were extruded at rear, middle, and front zone temperatures of 350° F, 370° F, and 380° F respectively, and a die temperature of 380° F. The spaghetti die had 10 orifices of 1/8⁹⁄₁₆ inch diameter each, from which were extruded the strands on to a continuously moving belt and thence into a cold water quenching bath. The strands were then fed to a chopper, and the chopped pellets finally dried at 180° F for 3 hours. A solution consisting of 25 percent by weight of each elastomer blend dissolved in tetrahydrofuran was prepared, from which films were cast for test purposes. The films were dried for 24 hours at room temperture, followed by 16 hours at 60° C then allowed to stand for 7 days. The cured films were then subjected to physical testing. The blends and their properties are set forth in Table III below, including the Brookfield viscosities of the 25% solution in tetrahydrofuran determined at room temperature.

TABLE III

| % by wt. | | Blend | Tensile | Viscosity |
|---|---|---|---|---|
| Elastomer D | Elastomer F | Shore A/D | Str.,psi | cps |
| (a) 10 | 90 | 94/50 | 5000 | 350 |
| (b) 25 | 75 | 90/45 | 5200 | 345 |
| (c) 50 | 50 | 85/35 | 5500 | 355 |
| (d) 75 | 25 | 80/30 | 4575 | 325 |
| (e) 90 | 10 | 70/25 | 3550 | 340 |

I claim:

1. An aprotic oxygen-containing organic solvent soluble thermoplastic polyurethane elastomer characterized by a hardness from about 67 Shore A to about 73 Shore A consisting essentially of:

a polyurethane having the recurring unit $$\left[ \begin{array}{c} \overset{O}{\underset{\|}{C}}-NH-\!\!\!\bigcirc\!\!\!-CH_2-\!\!\!\bigcirc\!\!\!-NH-\overset{O}{\underset{\|}{C}}-O-R-O \end{array} \right]$$

wherein R is the residue of a hydroxyl terminated poly(1,4-butylene adipate) having a molecular weight from about 600 to about 750, and wherein the molar proportion of said residue R to said residue

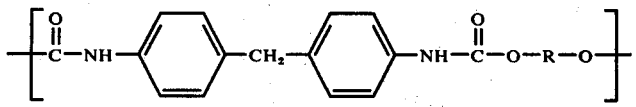

in the overall recurring unts is 1:0.95-0.98.

2. A thermoplastic polyurethane elastomer according to claim 1 which contains an aprotic oxygen-containing organic solvent soluble wax lubricating agent.

3. A thermoplastic polyurethane elastomer according to claim 1 wherein said hydroxyl terminated poly(1,4-butylene adipate) has a molecular weight of about 700.

4. A thermoplastic polyurethane elastomer according to claim 1 wherein the molar proportion of said residue R to said residue

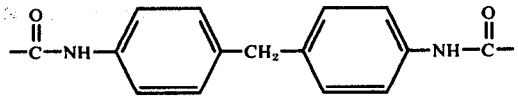

in the overall recurring units is 1:0.97.

5. An aprotic oxygen-containing organic solvent soluble thermoplastic polyurethane elastomer characterized by a hardness from about 67 Shore A to about 73 Shore A consisting essentially of:
a polyurethane having the recurring unit

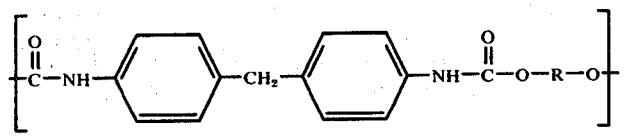

wherein R is the residue of a hydroxyl terminated poly(1,4-butylene adipate) having a molecular weight of about 700, and wherein the molar proportion of said residue R to said residue

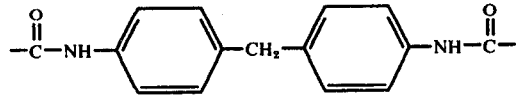

in the overall recurring units is 1:0.97.

6. A thermoplastic polyurethane elastomer according to claim 5 which contains an aprotic oxygen-containing organic solvent soluble wax lubricating agent.

7. A composition comprising a thermoplastic polyurethane elastomer according to claim 6 and an aprotic oxygen-containing organic solvent.

8. An aprotic oxygen-containing organic solvent soluble thermoplastic polyurethane elastomer characterized by a hardness from about 52 Shore D to about 58 Shore D consisting essentially of:
a polyurethane having the recurring unit

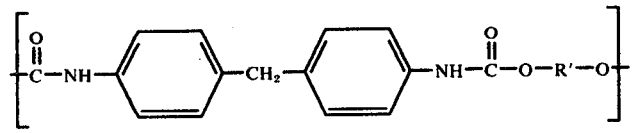

wherein from about 67 percent to about 72 percent of said recurring units are those in which R' represents the residue of a hydroxyl terminated poly(neopentylene adipate) having a molecular weight from about 450 to about 550, and from about 33 percent to about 28 percent of said recurring units are those in which R' represents the residue of a hydroxyl terminated poly(1,4-butylene adipate) having a molecular weight from about 300 to about 360, and wherein the total molar proportion of said residue R' to said residue

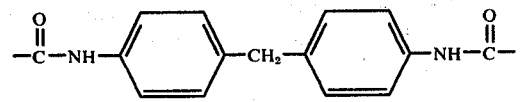

in the overall recurring units is 1:0.95-0.98.

9. A thermoplastic polyurethane elastomer according to claim 8 which contains an aprotic oxygen-containing organic solvent soluble wax lubricating agent.

10. A thermoplastic polyurethane elastomer according to claim 8 wherein the hydroxy terminated poly(neopentylene adipate) has a molecular weight of about 500.

11. A thermoplastic polyurethane elastomer according to claim 8 wherein said hydroxyl terminated poly(1,4-butylene adipate) has a molecular weight of about 330.

12. A thermoplastic polyurethane elastomer according to claim 8 wherein about 69 percent of said recurring units are those in which R' represents the residue of said hydroxyl terminated poly(neopentylene adipate), and about 31 percent of said recurring units are those in which R' represents the residue of said hydroxyl terminated poly(1,4-butylene adipate).

13. A thermoplastic polyurethane elastomer according to claim 8 wherein the total molar proportion of said residue R' to said residue

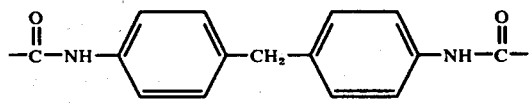

in the overall recurring units is 1:0.97.

14. An aprotic oxygen-containing organic solvent soluble thermoplastic polyurethane elastomer characterized by a hardness from about 52 Shore D to about 58 Shore D consisting essentially of:
a polyurethane having the recurring unit

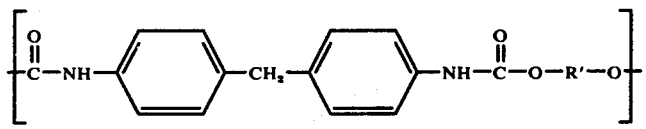

wherein about 69 percent of said recurring units are those in which R' represents the residue of a hydroxyl terminated poly(neopenytylene adipate) having a molecular weight of about 500, and about 31 percent of said recurring units are those in which R' represents the residue of a hydroxyl terminated poly(1,4-butylene adipate) having a molecular weight of about 330, and wherein the total molar proportion of proportion of said residue R' to said residue

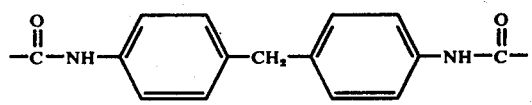

in the overall recurring units is 1:0.97.

15. A thermoplastic polyurethane elastomer according to claim 14 which contains an aprotic oxygen-containing organic solvent soluble wax lubricating agent.

16. A composition comprising a thermoplastic polyurethane elastomer according to claim 15 and an aprotic oxygen-containing organic solvent.